United States Patent [19]

Spencer

[11] E Re. 31,511

[45] Reissued Jan. 31, 1984

[54] ROTARY CUTTERHEAD FOR AN EARTH BORING MACHINE

[75] Inventor: Barry A. Spencer, Redmond, Wash.

[73] Assignee: The Robbins Company, Kent, Wash.

[21] Appl. No.: 318,618

[22] Filed: Nov. 5, 1981

Related U.S. Patent Documents

Reissue of:

[64] Patent No.: 4,193,637
Issued: Mar. 18, 1980
Appl. No.: 931,384
Filed: Aug. 7, 1978

[51] Int. Cl.[3] ..... E21C 25/16

[52] U.S. Cl. ..... 299/56; 299/58; 299/86; 299/90

[58] Field of Search ..... 291/31, 55, 56, 58, 291/86, 90; 175/53, 95, 96

[56] References Cited

U.S. PATENT DOCUMENTS

| | | | |
|---|---|---|---|
| 1,530,768 | 3/1925 | Hoag | 299/58 |
| 3,191,699 | 6/1965 | Robbins et al. | 299/33 |
| 3,301,600 | 1/1967 | Pirvie et al. | 299/90 |
| 3,309,142 | 3/1967 | Winberg | 299/33 |
| 3,358,782 | 12/1967 | Bechem | 175/344 |
| 3,411,826 | 11/1968 | Waller et al. | 299/31 |
| 3,413,033 | 11/1968 | Clark | 299/33 |
| 3,444,939 | 5/1969 | Bechem | 175/334 |
| 3,511,539 | 5/1970 | Schonfeld | 299/56 |
| 3,612,196 | 10/1971 | Dixon | 175/364 |
| 3,706,635 | 12/1972 | Conn | 175/364 |
| 3,749,188 | 7/1973 | Schumacher, Jr. | 175/364 |
| 3,756,332 | 9/1973 | Crane | 175/364 |
| 3,787,101 | 1/1974 | Sugden | 308/15 |
| 3,835,944 | 9/1974 | Bingham | 175/364 |
| 3,851,718 | 12/1974 | Fink | 175/363 |
| 3,863,994 | 2/1975 | Fink | 175/364 |

FOREIGN PATENT DOCUMENTS

| | | | |
|---|---|---|---|
| 13907 | of 1897 | United Kingdom | 299/56 |
| 762416 | 11/1956 | United Kingdom | 299/56 |
| 284008 | 12/1970 | U.S.S.R. | 299/86 |

OTHER PUBLICATIONS

Robbins Drawings D10665, 12-30-75.
Robbins Drawings D8453, 9-20-74, D10679, 2-9-76.
Chapter 21 of 1976 Rapid Excavation and Tunneling Conference Proceedings pp. 355-376, Jun. 14, 1976.
Photo of Robbins Models 144-151, 165-162, 352-128.

*Primary Examiner*—William F. Pate, III
*Attorney, Agent, or Firm*—Graybeal & Cullom

[57] ABSTRACT

The main frame of the cutterhead comprises a plurality of radial spoke beams which are interconnected between a box-like hub structure and an annular box beam by which the cutterhead is mounted for rotation. Cutter mounting wells are defined by and between side wall portions of the radial spoke beams. The mined material passes rearwardly through the cutterhead via openings between adjacent radial spoke beams and open spaces in the cutter mounting wells. Cutter mounts span laterally between the side plate members and laterally brace the radial spoke beams in addition to mounting the cutters. The radial spoke beams curve rearwardly at their outer ends and connect to the annular box beam at a location spaced enough rearwardly from the front portions of the spoke beams that a room is defined within the cutterhead. Roller type cutters are installed onto and removed from the cutterhead frame from the rear side of the cutterhead.

23 Claims, 15 Drawing Figures

Fig. 6.
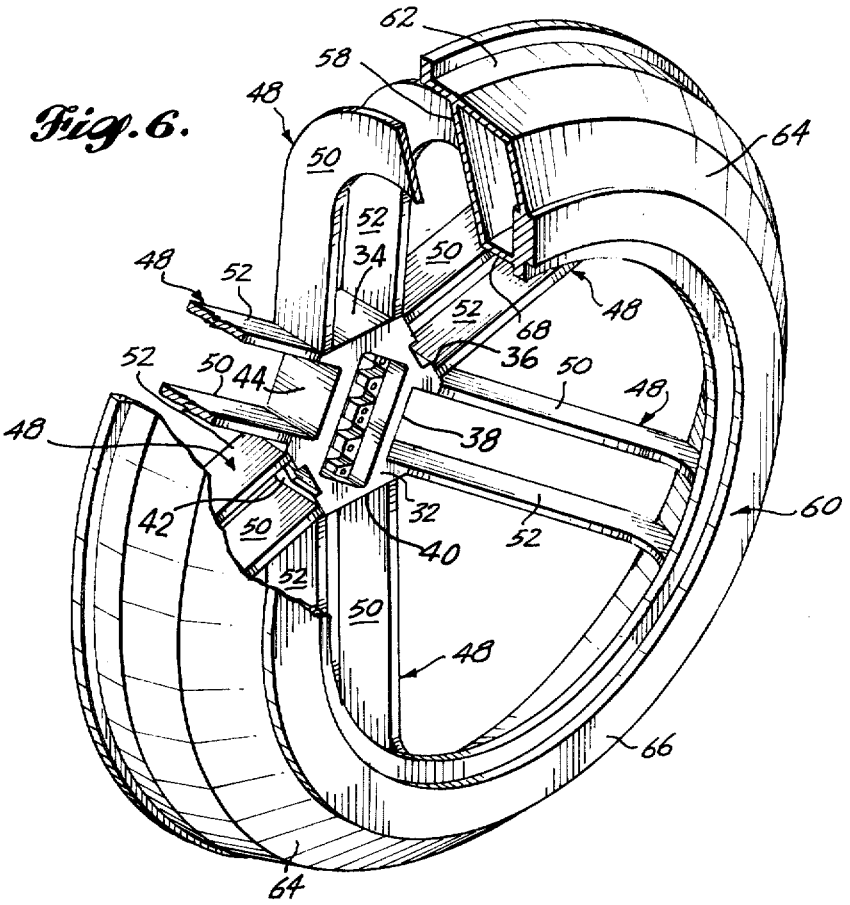
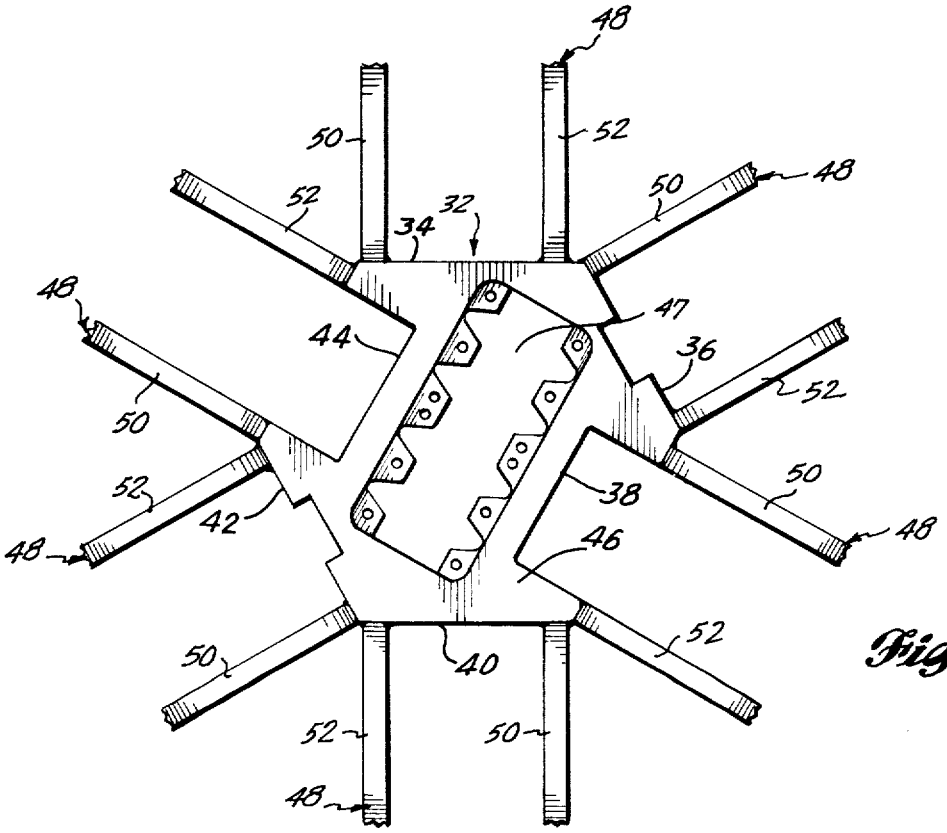
Fig. 7.

ROTARY CUTTERHEAD FOR AN EARTH BORING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to rock boring machines, and in particular to a new cutterhead construction for such a machine.

2. Description of the Prior Art

U.S. Pat. No. 3,756,332, granted Sept. 4, 1973, to Clayton H. Crane, and assigned to the The Robbins Company, discloses a popular open face cutterhead and a typical cutter arrangement on a cutterhead. The cutterhead includes a plurality of disc cutter assemblies positioned for cutting concentric kerfs in the rock. The disc cutters include sloping breaker surfaces flanking circumferential cutting edges. These breaker surfaces serve to fracture and dislodge the rock material between kerfs which are cut by the cutting edges.

The cutter assemblies are mounted onto the front side of the cutterhead. Most of them are mounted on the front walls of radial spoke beams, while others are mounted on the front side of auxiliary frame structure that is angularly offset from the radial spoke beams. A disadvantage of this type of arrangement is that whenever it is necessary to replace the cutters, which is a frequent occurrence, it is necessary to back the cutterhead up from the tunnel face and then send a workman into the quite dangerous region forwardly of the cutterhead.

It is known to mount the cutters onto the rear side of the cutterhead so that cutter replacement can be made in relative safety behind the cutterhead. However, such rear mounting is most normally associated with closed face cutterheads and has not been used with open face cutterheads. The term "open face tunneling machine" is used herein to mean a cutterhead comprising a plurality of radial spoke beams on which most of the cutters are mounted, with spaces being provided between adjacent beams through which the mined material passes. In a closed face cutterhead the mined material is picked up only at the periphery of the cutterhead, except for pieces which are small enough to pass through the small spaces which exist about each roller cutter element.

Examples of rear mounting of roller cutters onto solid face cutterheads, existing in the patent literature, are disclosed by U.S. Pat. No. 3,358,782, granted Dec. 19, 1967 to Karl G. Bechem, and by U.S. Pat No. 3,444,939, granted May 20, 1969 also to Karl G. Bechem.

For some types of tunnel boring jobs the open face or spoke style of cutterhead possesses advantages over the closed face style of cutterhead in that the cut material can pass through the cutterhead at almost any level of the tunnel face and need not fall down to be picked up by peripheral buckets. A primary object of the present invention is to provide an improved open face type cutterhead on which all of the roller cutters, including a center cutter assembly and gauge cutters, are removable from the back side of the cutterhead.

SUMMARY OF THE INVENTION

According to an aspect of the present invention, the cutterhead main frame comprises a box-like hub structure having peripheral wall means defining a center space. A plurality of radial spokes are integrally connected to the peripheral wall means of the hub structure and extend radially outwardly therefrom to at their outer ends be integrally connected to an annular box beam which mounts the cutterhead for rotation about an axis of rotation. Each radial spoke beam comprises a pair of spaced apart side plate members.

According to an aspect of the invention, roller type cutters are mounted between the side plate members by cutter mounts which extend transversely of the radial spoke beams and are integrally connected at their ends to the spaced apart side plate members, to also function as structural brace members for the radial spoke beam.

According to an aspect of the invention, the cutter mounts are adapted for installation and removal of the roller cutters from the rear side of the cutterhead. The main frame is configured to provide a room or space inside the cutterhead large enough to provide room for installation and removal of the roller cutters from behind the cutterhead.

According to an aspect of the invention, the side plate members extend generally vertically at the front of the cutterhead and at their outer ends curve rearwardly before connecting to the annular box beam. The gauge cutters are mounted between the rearwardly extending outer end portions of the side plate members of at least some of the radial spoke beams. Installation and removal paths for the gauge cutters extend generally vertically in a region of the interior space that is located forwardly of the annular beam and rearwardly of the front portions of the radial spoke beams.

According to an aspect of the invention, the center cutter assembly is mounted within the interior of the hub structure. The conveyor for removing mined material rearwardly from the region of the cutterhead and its collector structure may be mounted for movement between a forward position in which the collector structure is in a collecting position adjacent the rear side of the cutterhead and a retracted position in which enough clearance is provided forwardly of it to allow installation and removal of the center cutter assembly.

The main frame of the cutterhead is relatively simple and the side plate members which define the radial spoke beams, and the cutter mount structure therein, perform the second function of mounting the roller cutters for easy removal from the rear side of the cutterhead. The rearwardly curved nature of the outer end portions of the side plate members provides the necessary room within the cutterhead to permit installation and removal of the gauge cutters from behind the cutterhead and also strengthens the peripheral region of the cutterhead. The edgewise orientation of the side plate members relative to the thrust forces imposed on the radial spoke beams contributes to the beams being relatively strong while relatively simple in construction. The annular box beam to which the radial spoke beam side plate members are connected provides a quite strong and rigid collector for the forces which are imposed on the radial spoke beams and evenly distribute such forces to the combination thrust and radial bearing which serves to mount the cutterhead for rotation.

Other features, characteristics and advantages of the present invention are discussed in, or will be apparent from, the following description of a typical and therefore non-limitative example of the invention.

BRIEF DESCRIPTION OF THE DRAWINGS

In the drawing, like element designations refer to like parts throughout, and:

FIG. 6 is a view similar to FIG. 5, but looking towards the rear side of the basic cutterhead frame, with an upper foreground portion of such frame being cut away for clarity of illustration of certain parts;

FIG. 7 is a fragmentary isometric view of the hub region of the cutterhead frame, taken from the rear of the cutterhead;

DESCRIPTION OF THE PREFERRED EMBODIMENT

The illustrated embodiment is the best mode of the invention presently known to applicant.

Figure 1:
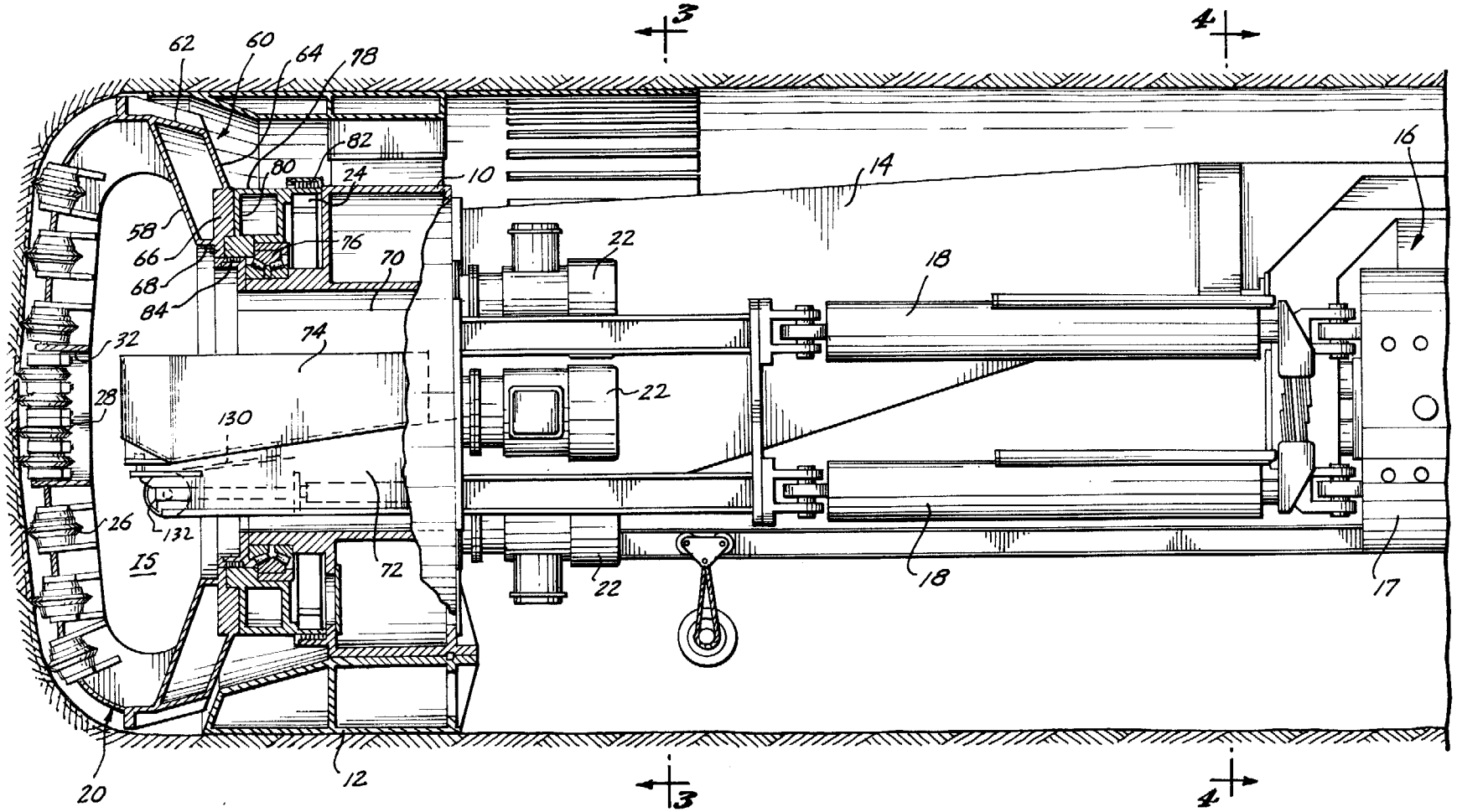
FIG. 1 is a fragmentary side elevational view, with some parts in axial section, of a tunnel boring machine which includes a cutterhead exemplifying the present invention, with the portion of the machine which is disposed rearwardly of the mid-portion of the gripper assembly being omitted.

Referring to FIG. 1, the tunneling machine itself is of the rotary cutterhead hard material disintegrating type. The advance direction is coincident to the rotary axis of the cutterhead and the tunneling machine follows the cutterhead into the opening formed thereby.

The basic parts of the tunneling machine are a main frame which includes a cutterhead support 10 attached to a tubular shield 12 and a rearwardly projecting beam 14. A gripper assembly 16 is supported for relative sliding movement along a straight portion of the beam 14. Thrust rams 18, located on both sides of the machine, are interconnected between the cutterhead support 10 and the gripper assembly 16, generally in the manner disclosed by U.S. Pat. No. 3,203,737, granted August 31, 1965 to Richard J. Robbins, Douglas F. Winberg and John Galgoczy, and by U.S. Pat. No. 3,861,748, granted Jan. 21, 1975, to David T. Cass.

As is well known in the tunneling machine art, the gripper assembly 16 is positioned forwardly on the beam 14. Its gripper shoes 17 are hydraulically moved outwardly into gripping contact with the side walls of the tunnel. Then, the thrust rams 18 are extended while the rotary cutterhead is being rotated by means of a plurality of drive motors 22. Motors 22 drive circular gears (not shown) which mesh with a large diameter gear 24 that is an integral part of the rotating cutterhead 20. When the cylinders 18 reach the forward limits of travel the gripper pads 17 are retracted and the cylinders 18 are retracted for the purpose of drawing the gripper assembly forward into a new position. Then, the gripper pads 17 are again moved outwardly into contact with the tunnel wall and the boring procedure is repeated.

The tunneling machine of this invention is adapted to cut a moderately crowned tunnel face, an idea which is itself old, as shown by U.S. Pat. No. 3,232,670, granted Feb. 1, 1966, to Richard J. Robbins and Douglas F. Winberg.

Roller cutters 26, 28, 30 (FIG. 2) are used and the arrangement or pattern of these cutters may be basically like what is shown by U.S. Pat. No. 3,756,332, granted Sept. 4, 1973, to Clayton H. Crane. The disc cutters are arranged to cut concentric kerfs (e.g. spaced 2¾"–4" apart) and to fracture the rock between kerfs. The frame construction of the cutterhead shown by U.S. Pat. No. 3,756,332 is not detailed in such patent, but is to a great extent disclosed by U.S. Pat. No. 3,861,748. Such frame comprises a plurality of radial spoke members or beams which are connected together at the center region of the cutterhead and which are connected at their outer ends to an annular mounting plate. The radial beams are tapering box beams having forward walls onto which most of the roller cutter assemblies are mounted. Open spaces are provided between such beams through which mined material moves axially rearwardly to a conveyor which removes such material rearwardly through the tunnel. Scoop means are [mounting] *mounted* along the trailing edges of such openings for scooping up such material and directing it through the cutterhead.

The cutterhead 20 of the present invention has some similarity to the open faced cutterhead disclosed by the aforementioned U.S. Pat. Nos. 3,756,332 and 3,861,748. However, the frame construction is completely different and the roller cutters are mounted in a different manner. The roller cutters 26, 28, 30 are all installed onto and removed from the cutterhead 20 from the rear side of the cutterhead 20. This makes it unnecessary for the tunneling machine to be backed up and for a workman to go down into the very hazardous region between the front of the cutterhead and the tunnel face for the purpose of changing cutters.

As discussed above, the general idea of mounting cutters onto a cutterhead from the rear is not new, but the disclosed construction of the cutterhead to facilitate such assembly and removal is new. Also, such construction allows rear installation and removal of the gauge cutters as well as the face cutters and theis capability is new.

Figure 2:
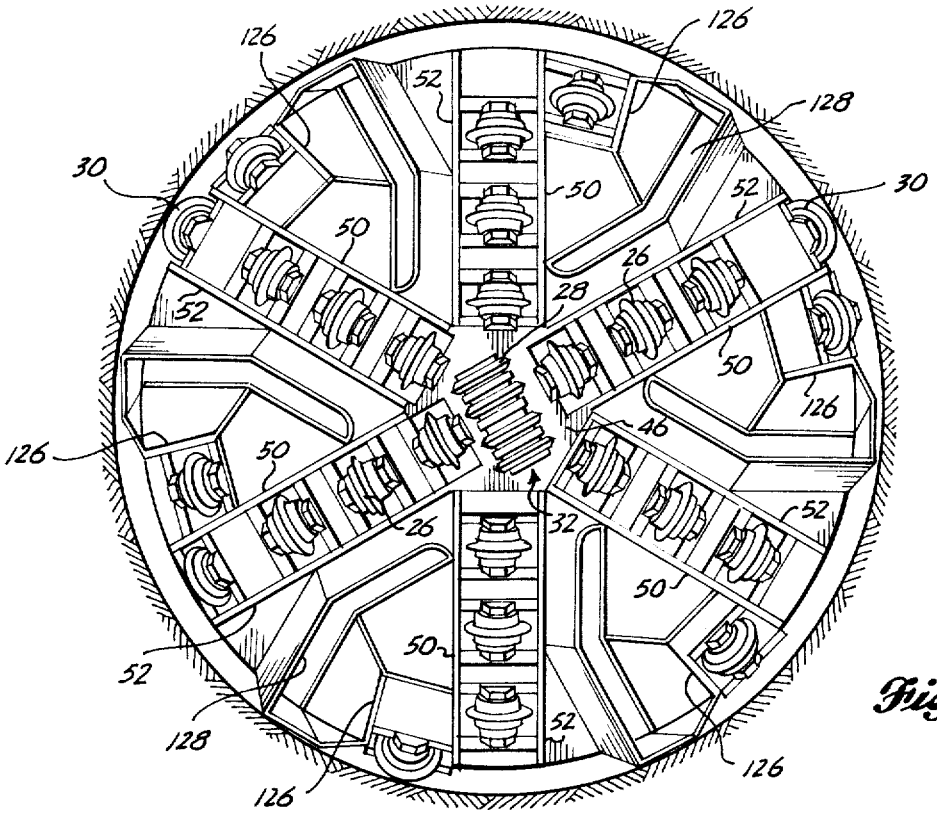
FIG. 2 is a front elevational view of the cutterhead.
Figure 3:
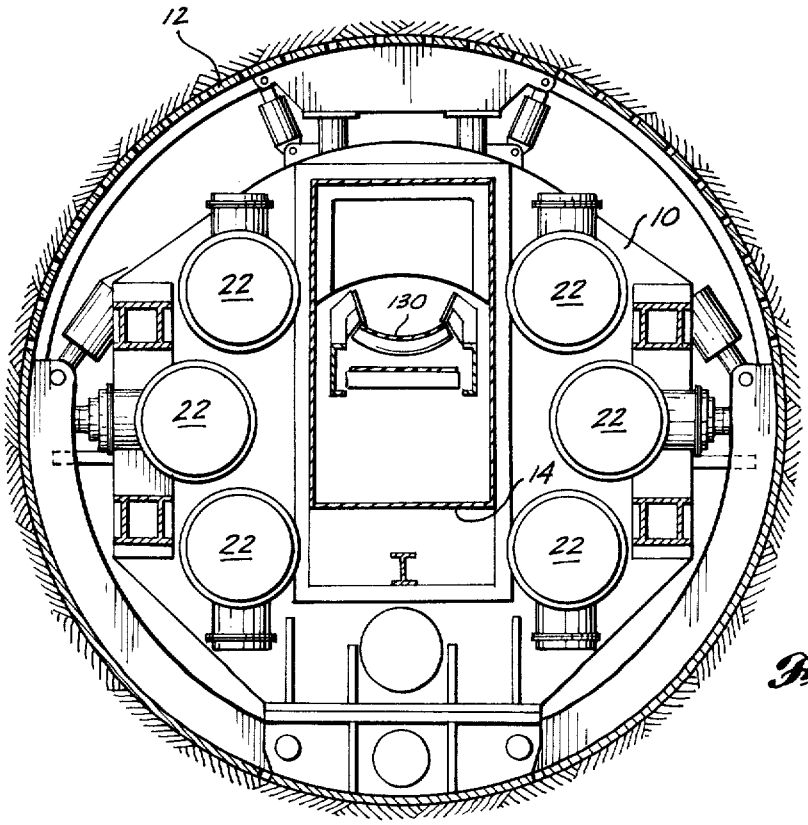
FIG. 3 is a sectional view taken through the boring machine substantially along line 3—3 of FIG. 1, showing the rear side of the cutterhead support in elevation.
Figure 4:
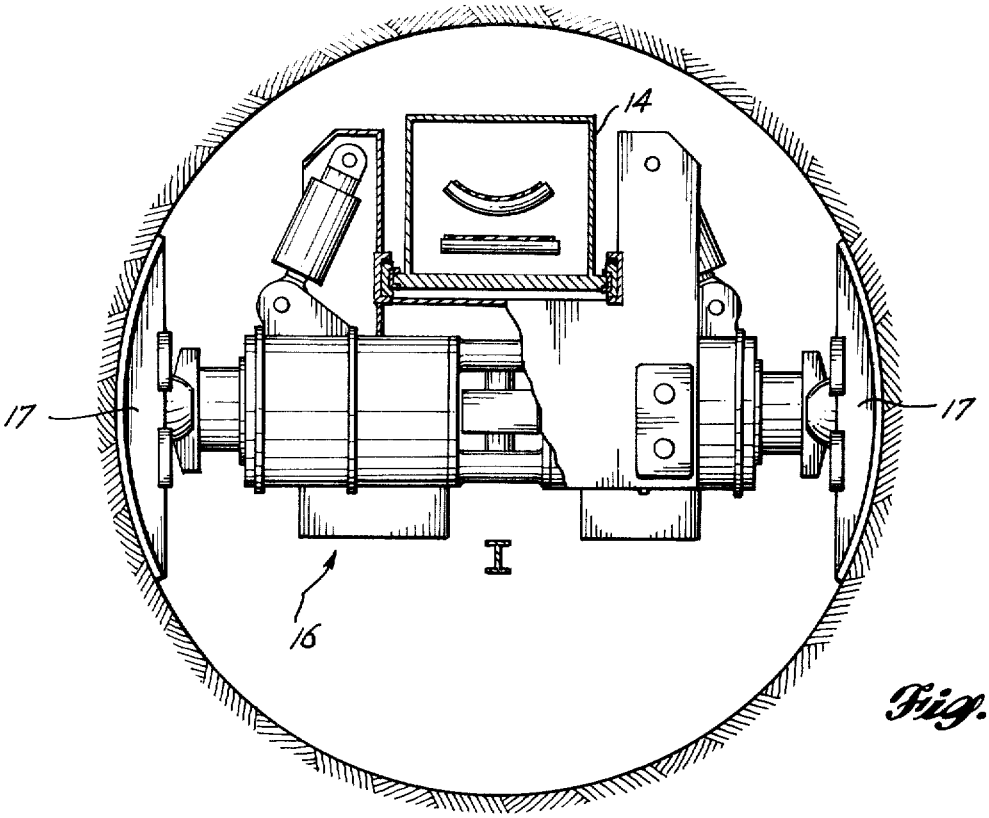
FIG. 4 is a cross-sectional view taken substantially along line 4—4 of FIG. 1, showing the gripper assembly in elevation, with some parts broken away for clarity of illustration of other parts.
Figure 5:
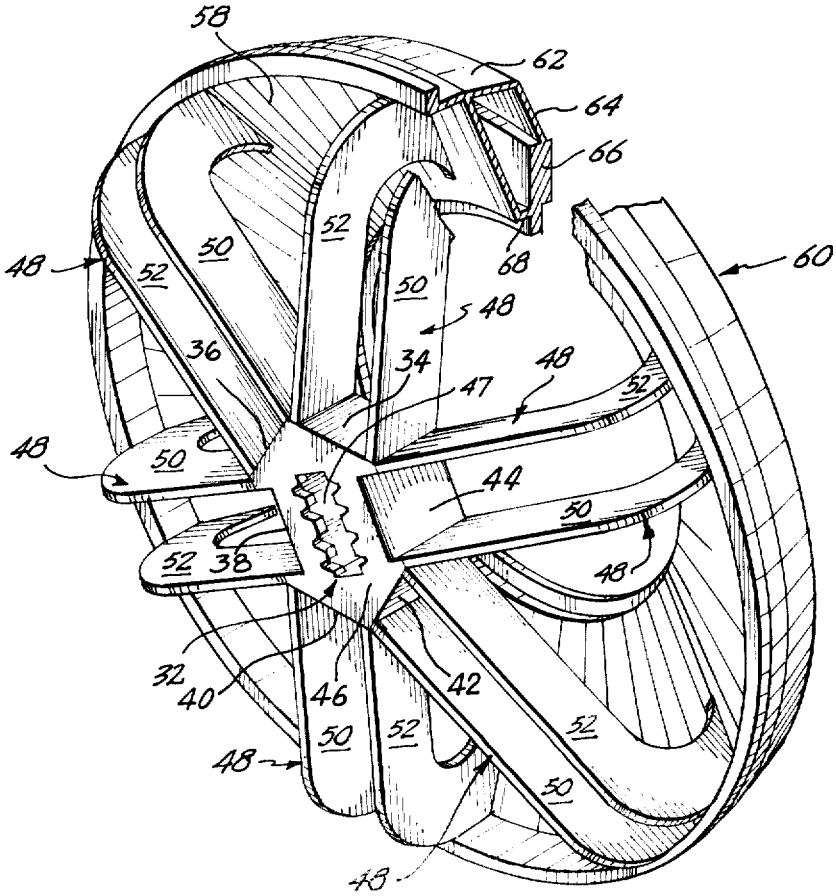
FIG. 5 is an isometric view taken from the front and looking down towards an upper portion and a side portion of the basic cutterhead frame, with a foreground portion of such frame being cut away.
Figure 8:
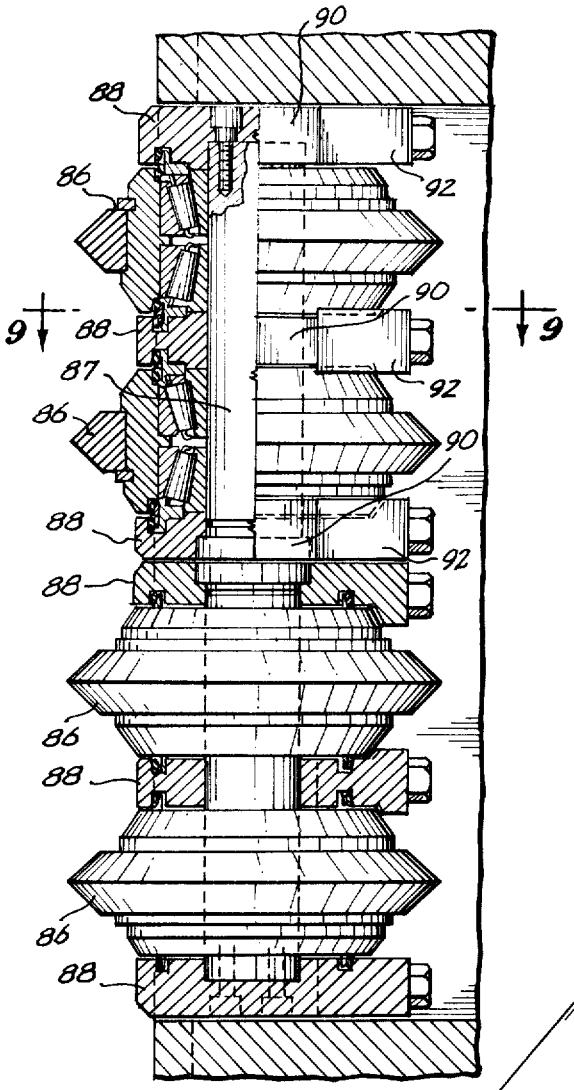
FIG. 8 is a fragmentary elevational view of the center region of the cutterhead, with some parts in section.
Figure 9:
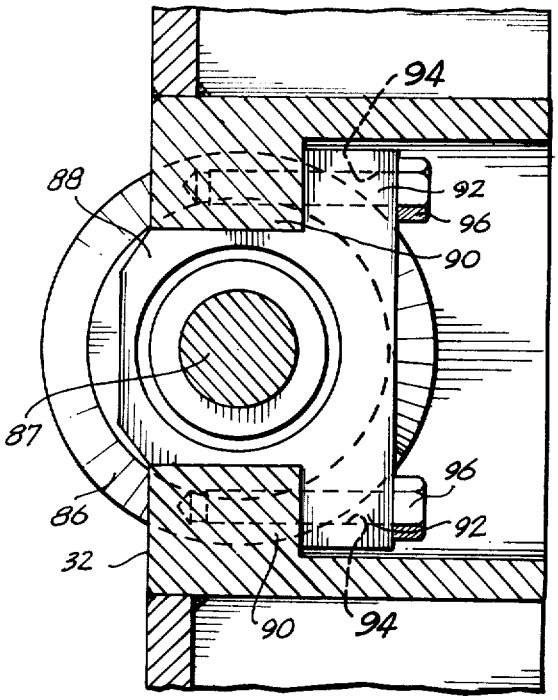
FIG. 9 is a sectional view taken substantially along line 9—9 of FIG. 8.
Figure 10:
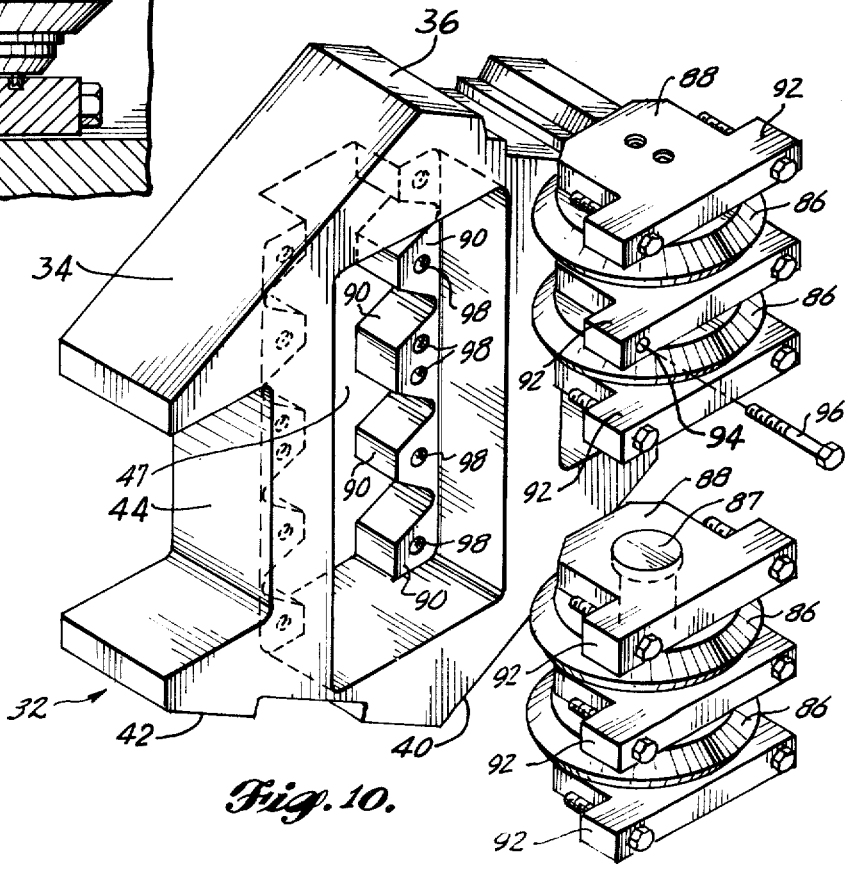
FIG. 10 is a fragmentary isometric view of the center region of the cutterhead, taken from behind the cutterhead, with the center cutter exploded out from its mounted position.

According to the present invention, the frame of the cutterhead comprises a box-like hub structure 32 which may be a one-piece casting. Hub structure 32 preferably is of a generally hexahedral form and comprises six peripheral walls 34, 36, 38, 40, 42, 44 and a front wall 46 (FIGS. 2 and 5). In larger cutterheads the number of radial spokes may be increased to eight. In smaller cutterheads the number may be reduced to four, for example. A window 47 is provided in the front wall 46 and the rear side of hub structure 32 is open. A plurality of radial spoke beams 48 are integrally connected (e.g. welded) to the hub structure 32 generally at the corner regions where the walls 34, 36, 38, 40, 42, 44 meet each other. As shown best by FIG. 7, radial stub walls may be provided at the corners. Each radial spoke beam 48 comprises a pair of spaced apart steel plate side walls 50, 52. The inner ends of side walls 50, 52 abut against end or side portions of the stub walls and are welded thereto. Each side wall 50, 52 occupies a plane which is substantially parallel to the tunnel axis. Thus, it can be said that in the fore and aft direction the side walls 50, 52 are parallel to each other and to the tunnel axis. For the most part the beams 48 are open both front and rear so that a front to rear open space exists between their side walls 50, 52. Spaces also exist between adjacent beams 48.

The front edges 54, 56 of the side plate members 50, 52 closely follow the desired contour of the tunnel face. As best shown by FIG. 1, this shape is preferably a relatively flat crown shape with a generally circular curvature existing at the outer regions.

As shown by FIGS. 1, 5 and 6, the side plate members 50, 52, extend generally radially outwardly from the center hub structure 32 and in their outer regions curve rearwardly about ninety degrees. The upper rear ends of the side plate members 50, 52 are integrally attached to a frusto-conical shape forward wall 58 of an annular box beam 60. Box beam 60 also includes a frusto-conical peripheral wall 62, a frusto-conical upper rear wall 64, a relatively husky mounting ring 66, which is also a lower rear wall, and a cylindrical inner wall 68. Of course, in other installations this construction of the annular box beam could be different.

The illustrated configuration of the side walls 50, 52 results in radial beams 48 which are quite strong in the direction of the thrust loads applied to them, since the side walls extend edgewise to the direction of thrust loading. Also, the configuration of side walls 50, 52 and thier location of connection with the annular box beam 60 results in a space existing between each pair of side walls 50, 52, throughout the full extent of beams 48, i.e. from where they are connected to the center hub member 32 out to where they are connected to the annular box beam 60, in which the roller cutters are mounted. Such configuration of side walls and the location of attachment of the members 50, 52 to the beam 50, also provides a sufficient amount of interior apace IS (FIG. 1) within the cutterhead 20 to allow installation and removal of all of the cutters from behind the cutterhead. Installation and removal paths for the gauge cutters 30 are defined in a generally vertical direction, forwardly of the box beam forward wall 58.

The cutterhead support includes a central axial passageway 70 which houses the front portion 72 of a conveyor assembly and a hopper or collector 74 associated therewith. The cutterhead support also supports a large diameter bearing 76 of a type which is commonly used in tunneling machines having open centered cutterheads. The box beam 60 is secured to a second smaller diameter box beam 78 which is directly supported for rotation by the bearing 76. The mounting ring 66 is secured to a front radial wall 80 of box beam 78.

The usual dirt seals 82, 84 are provided between the rotating and nonrotating parts at each end of the bearing 76.

As best shown by FIGS. 1 and 7–10 the center cutter assembly 28 is mounted inside of the center hub structure 32. By way of typical and therefore non-limitative example, the center cutter assembly itself may be constructed very much like the center cutter assembly disclosed by the aforementioned U.S. Pat. No. 3,756,332, with the number of disc cutters being a variable. However, the manner of mounting is different.

In the illustrated embodiment the center cutter assembly 28 comprises four disc cutters 86. Mounting frames are used which permit mounting of the center cutter assembly 28 from the rear side of the cutterhead. Center cutter assembly 28 may include two parts, each including a pair of disc cutters 86 mounted on a single shaft 87. When the center cutter assembly 28 is inserted into the open center of hub structure 32, support portions 88 enter spaces between retainer portions 90 of the hub structure 32. These retainer portions 90 border the sides of the window 47. The center cutter mounting frames also includes mounting flanges 92, formed to include openings 94 (FIG. 9) for receiving bolts 96 which thread into threaded openings 98 which are formed in retainer portions 90.

Figure 11:
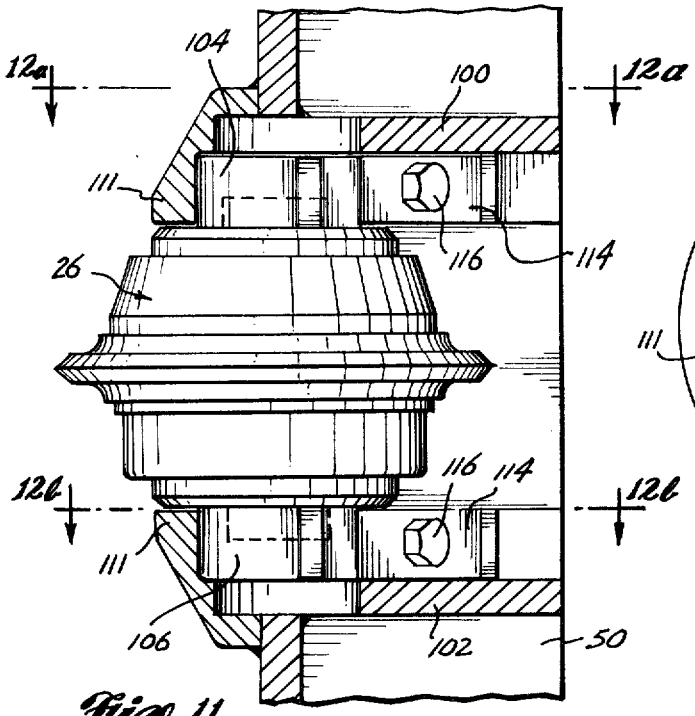
FIG. 11 is a fragmentary view, partially in section and partially in elevation, of an intermediate cutter, showing a way of mounting the cutter.
Figure 12:
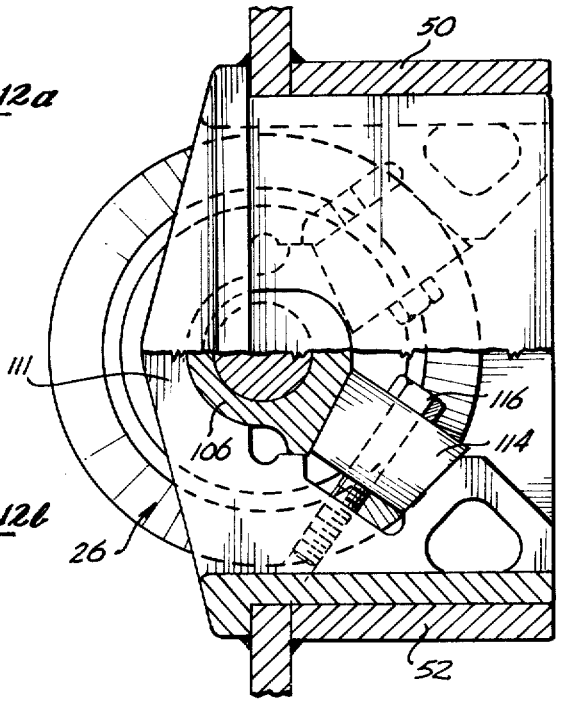
FIG. 12 is a split sectional view, the upper portion being taken along line 12a—12a and the lower portion along line 12b—12b, of FIG. 11.
Figure 13:
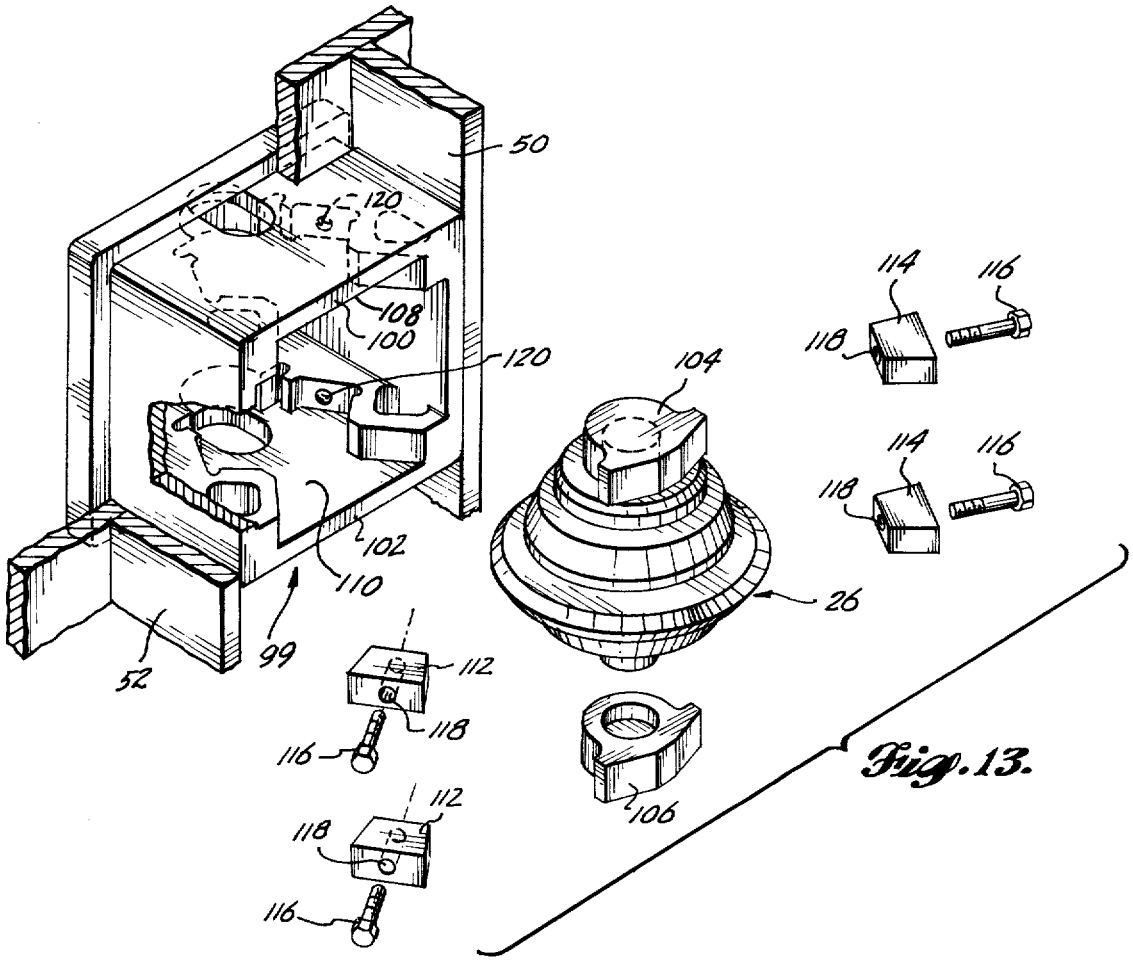
FIG. 13 is an exploded isometric view of an intermediate cutter and its mounting structure.

Referring now to FIGS. 11–13, the single disc cutter units 26 which are mounted within the radial beams 48 are mounted by a cutter mount structure which also functions as a lateral reinforcement for the beams 48. This structure may comprise a box 99 which includes a pair of radially spaced apart end walls 100, 102. The end walls 100, 102 are welded into place between the beam side walls 50, 52 to form cutter compartments or wells. The inner face of each end member 100, 102 is constructed to include an avenue 108, 110 sized to receive an end portion 104, 106 of the stator part of the cutter assembly 26, and also load transfer blocks 112, 114.

The roller cutter assembly 26 is moved into and is removed out from the cutter well from behind the cutterhead 20. FIG. 13 shows a roller cutter assembly 26 spaced rearwardly from the rear portal of its cutter well. When assembly 26 is moved forwardly into the well the end portions 104, 106 enter via the avenues 108, 110. The roller cutter assembly 26 is moved forwardly until the front ends of the end members 104, 106 are against forward stops 111. Then, load transferring blocks 112, 114 are moved through the rear portal and into the channels 108, 110 (FIG. 12). Bolts 116 may be inserted through openings 118 formed through the blocks 112, 114 and threaded into openings 120 provided in the frame members 100, 102. As will be appreciated, when the bolts 116 are tightened they will draw the load transfer blocks 112, 114 into tight engagement with load carrying surfaces which are the forwardly directed vertical surfaces of channels 108, 110.

Such load carrying surfaces constitute surfaces on the cutterhead frame since the end members 100, 102 are integral portions of the cutterhead frame. Thus, thrust loads imposed on the cutting portion of the roller cutter are transmitted in compression through the load transfer blocks 112, 114 into the cutterhead frame.

Referring to FIG. 2, the cutterhead may be completed by adding auxiliary frame members 126 (plates on edge) in a spaced relationship to the frame members 50, 52, to define spaces alongside of the inner spaces of the spokes which are very similar to the inner spaces of the spokes for receiving additional roller cutters. The cutterhead may also be provided with radially elongated scoops 128 and a plate metal facing around the scoops and inbetween the radial beams 48. As shown by FIG. 2, the scoops have inlets for the mined material which commence adjacent the hub 32 and extend out to the periphery of the cutterhead.

During tunneling the collector 74 at the forward end of the conveyor 72 is positioned relatively close behind the center cutter assembly 28. The cuttings picked up by the scoops 128 drop into the collector 74. They fall onto the conveyor belt 130 and are carried thereby to a system of additional conveyors and/or material carts which remove the mined material out from the tunnel in one of a number of known ways, none of which constitute a part of the present invention.

Figure 14:
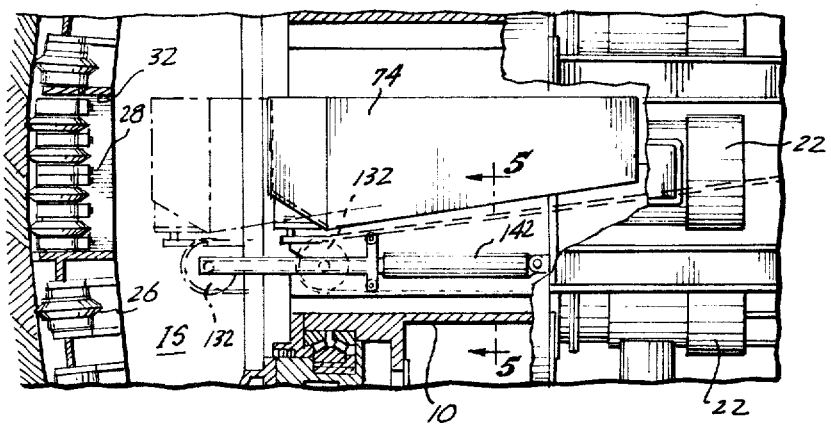
FIG. 14 is a fragmentary view of that portion of FIG. 1 in the vicinity of the forward end of the conveyor, with the conveyor being shown in a retracted position back from the inner side of the cutterhead, and including a broken line showing of the forward or in use position of the conveyor.
Figure 15:
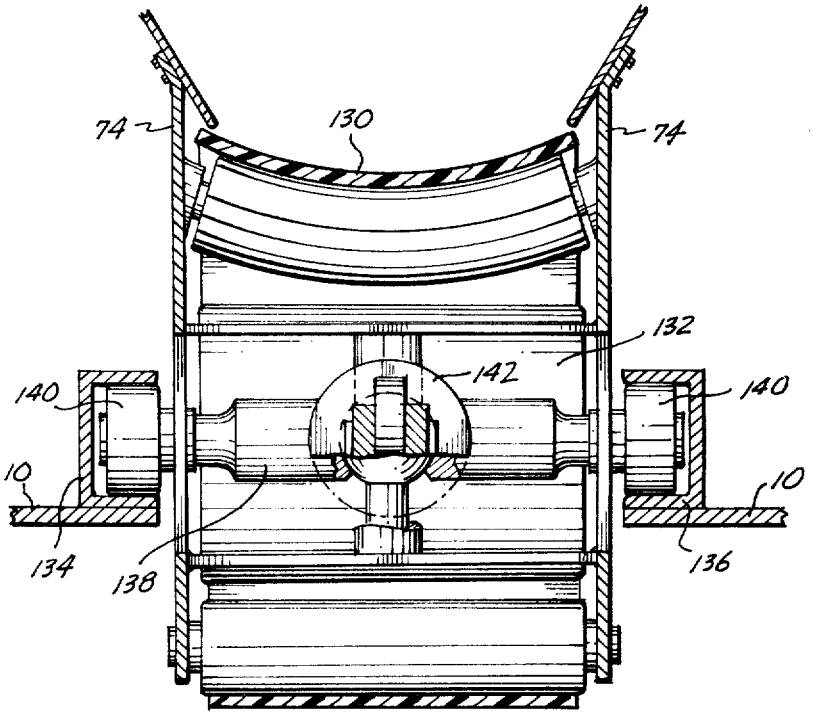
FIG. 15 is a sectional view taken substantially along line 15—15 of FIG. 14, showing the mechanism which mounts the front end of the conveyor.

According to an aspect of the invention, however, provision is made for retracting the collector so that access may be had to the inner space IS of the cutterhead, for the purpose of replacing cutters. One way of moving the conveyor out of the way would be to construct the conveyor so that it could be retracted in total from its operative position. The rear end of the conveyor is mounted on wheels or the like, and the front end of the conveyor is normally connected to the cutterhead support 10. In preparation to replace a cutter the front end of the conveyor could be disconnected from the cutterhead support, and then the conveyor could be forced rearwardly. The cutterhead support could be provided with some sort of bearing arrangement to support the front end portion of the conveyor for sliding movement. However, it is presently contemplated that the forward frame portion of the cutterhead, which includes the material collector 74 and a forward pulley 132 on which the conveyor belt reverses its direction, are mounted to be movable relative to both the cutterhead support 10 and the rest of the conveyor. As shown by FIGS. 14 and 15, a pair of tracks 134, 136 may be provided to extend axially of the tunnel on opposite sides of the conveyor 72. A front end carriage 138 may be mounted for axial movement in the tunnel by means of rollers 140 which are engaged by the tracks 134, 136. The front end portion of the conveyor frame, including the material collector 74 and the front roller 132 are carried by the carriage 138. The carriage 138 may be controlled in position by means of one or more hydraulic cylinders 142 (FIG. 14) which extend axially of the tunnel and are connected at their forward ends to the carriage 138 and at their rearward ends to a portion of the cutterhead support 10. The cylinders 142 are extended for the purpose of moving the collector into the material collecting position relative to the cutterhead. When in this position, the conveyor belt 130 is tightened. The cylinders 142 may be retracted for the purpose of moving the front portion of the conveyor rearwardly an amount sufficient to create sufficient working room within the inner space IS of the cutterhead (FIG. 14). Retraction of the cylinders 142 causes them to move the forward frame portion of the conveyor belt rearwardly, relative to both the cutterhead and the conveyor belt. The thus slackened forward end portion of the conveyor belt is then merely folded out of the way, so that it will not interfere with cutter removal and installation work within the inner space IS. Of course, the manner of moving the forward end portion of the conveyor 72 out from the inner space IS could be accomplished in any one of a number of other ways, as well.

What is claimed is:

1. A main frame for a rotary cutterhead of an earth boring machine, said main frame comprising:

an annular box beam by which the cutterhead is mounted onto an earth boring machine, for rotation about an axis of rotation;

a box-like hub structure comprising peripheral wall means defining a center space;

a plurality of radial spoke beams having inner ends which are integrally connected to the peripheral wall means of the hub structure and outer ends which are integrally connected to the annular box beam, each said radial spoke beam comprising a pair of spaced apart side plate members;

roller cutter mounts within said radial spoke beams comprising wall members which extend transversely of the radial spoke means and are integrally connected at their ends to the spaced apart side plate members, to also function as structural brace members for the radial spoke beams;

wherein the cutter mounts are adapted for installation and removal of roller cutters from the rear side of the cutterhead, and wherein said main frame is configured to provide an interior space for a workman which is large enough to provide room for installation and removal of roller cutters from behind the cutterhead.

2. A main frame according to claim 1, wherein each radial spoke beam extends rearwardly as it extends radially outwardly from the hub structure to the annular box beam.

3. A main frame according to claim 1, wherein the peripheral wall means of the hub structure comprises six walls interconnected to give the hub structure a generally hexahedral form, and wherein the main frame comprises six radial spoke beams, with the inner ends of the radial spoke beams being connected to the hub structure generally at the corner regions where the walls of the hub structure meet each other.

4. A rotary cutterhead for an earth boring machine, comprising:

a main frame comprising:

an annular hollow box beam by which the cutterhead is mounted onto an earth boring machine, for rotation about an axis of rotation;

a box-like hub structure comprising peripheral wall means defining a center space; and a plurality of radial spoke beams having inner ends which are integrally connected to the peripheral wall means of the hub structure and outer ends which are integrally connected to the annular box beam, each said radial spoke beam comprising a pair of spaced apart side plate members defining spaces between them;

a center cutter assembly comprising a plurality of roller cutters and means mounting said roller cutters within the center space of the hub structure, with peripheral portions thereof projecting forwardly from the cutterhead main frame;

a plurality of roller cutters radially outwardly of said center cutter assembly and means for mounting them within the spaces between the side plate members, with peripheral portions thereof projecting forwardly from the cutterhead main frame;

wherein the means for mounting the roller cutters between the side plate members comprises wall members which extend transversely of the radial spoke means and are integrally connected at their ends to the spaced apart side plate members, to also function as structural brace members for the radial spoke beams;

wherein the means for mounting the roller cutters between the side plate members provide for installation and removal of the roller cutters from the rear side of the cutterhead; and wherein said main frame is configured to provide an interior space for a workman which is large enough to provide room for installation and removal of the roller cutters from behind the cutterhead.

5. A rotary cutterhead according to claim 4, comprising roller gauge cutters generally at the periphery of the cutterhead, and wherein in the regions of the gauge cutters the side plate members of the radial spoke beams curve rearwardly generally over the interior space, and wherein such regions the means mounting the gauge cutters between the side plate members defines installation and removal paths which extend generally vertically in regions forwardly of the annular box beam.

6. A rotary cutterhead according to claim 4, wherein spaces exist between the radial spoke beams through which mined material may pass axially through the cutterhead.

7. A rotary cutterhead according to claim 4, wherein each radial spoke beam extends rearwardly as it extends radially outwardly from the hub structure to the annular box beam.

8. A rotary cutterhead according to claim 4, wherein the peripheral wall means of the hub structure comprises six walls interconnected to give the hub structure a generally hexahedral form, and wherein the main frame comprises six radial spoke beams, with the inner ends of the radial spoke beams being connected to the hub structure generally at the corner regions where the walls of the hub structure meet each other.

9. A rotary cutterhead for an earth boring machine, comprising:

a main frame comprising:

an annular beam by which the cutterhead is mounted onto an earth boring machine, for rotation about an axis of rotation; and a plurality of radial spoke beams, each comprising a pair of spaced apart side plate members defining spaces between them, said side plate members extending generally vertically at the front of the cutterhead and at their radially outer ends curving rearwardly;

a plurality of roller cutters and cutter mount means for mounting them within the spaces between the side plate members, with peripheral portions thereof projecting forwardly of the main frame, said roller cutters including a gauge cutter mounted between the generally rearwardly extending radially outer end portions of the side plate members of at least some of said radial spoke beams, said cutter mount means providing for installation and removal of the roller cutters from the rear side of the cutterhead, and wherein said main frame is configured to provide an interior space in the cutterhead that is large enough to provide room for installation and removal of said roller cutters from behind the cutterhead; and wherein the cutter mount means for the gauge cutters define installation and removal paths which extend generally vertically in a region of such interior space that is located forwardly of the annular beam.

10. A rotary cutterhead according to claim 9, wherein said cutter mounts also function as transverse structural braces for the radial spoke beams.

11. A main frame for a rotary cutterhead of an earth boring machine, said main frame comprising:

an annular box beam by which the cutterhead is mounted onto an earth boring machine, for rotation about an axis of rotation;

a box-like hub structure comprising peripheral wall means defining a center space;

a plurality of radial spoke beams having inner ends which are integrally connected to the peripheral wall means of the hub structure and outer ends which are integrally connected to the annular box beam, each said radial spoke beam comprising a pair of spaced apart side plate members; and wherein each radial spoke beam extends rearwardly of the hub structure as it extends radially outwardly from the hub structure to the annular box beam.

12. An earth boring machine, comprising:

a cutterhead support including a relatively large central passageway;

bearing means on said cutterhead support surrounding said passageway;

a rotary cutterhead comprising:

an annular box beam by which the cutterhead is mounted onto said bearing, for rotation about an axis of rotation;

a box-like hub structure comprising peripheral wall means defining a center space; and a plurality of radial spoke beams having inner ends which are integrally connected to the peripheral wall means of the hub structure and outer ends which are integrally connected to the annular box beam, each said radial spoke beam comprising a pair of spaced apart side plate members defining spaces between them;

a center cutter assembly comprising a plurality of roller cutters and center cutter mount means for detachably mounting said roller cutters within the center space of the hub structure, with peripheral portions thereof projecting forwardly from the cutterhead main frame, and providing for installation and removal of the roller cutters from behind the cutterhead; and wherein spaces exist between the spoke beams through which mined material may pass axially through the cutterhead;

a plurality of roller cutters spaced radially outwardly of said center cutter assembly and cutter mount means for detachably mounting them within the spaces between the side plate members, with peripheral portions thereof projecting forwardly from the cutterhead main frame, and providing for installation and removal of the roller cutters from behind the cutterhead; and mined material receiving collector means supported within said passageway, for movement between a forward position in which it is located partially within the inner space of the cutterhead, in a position to receive the mined material, and a retracted rearward position in which it is spaced far enough rearwardly from the center cutter assembly to provide sufficient room for installation and removal of the center cutter assembly into and out from the center space of the box-like hub structure.

13. A rotary cutterhead according to claim 12, comprising roller gauge cutters generally at the periphery of the cutterhead, and wherein in the regions of the gauge cutters the side plate members of the radial spoke beams curve rearwardly generally over the interior space, and wherein such regions the means mounting the gauge cutters between the side plate members defines installation and removal paths which extend generally vertically in regions forwardly of the annular box beam.

*14. A main frame for a rotary cutterhead of an earth boring machine, said main frame comprising:*

*an annular beam having mounting means by which the cutterhead is mounted onto the earth boring machine for rotation about an axis of rotation;*

*a central hub structure disposed forwardly of the annular beam; and*

*a plurality of radial spoke beams having inner ends integrally connected to the hub structure, intermediate portions extending rearwardly and radially outwardly from the hub structure to the annular beam and outer ends which are integrally connected to the annular beam thereby to form the main frame in a generally dome shape to define an open interior space within the main frame, each of the radial spoke beams having side portions defining an elongate opening extending substantially along the entire length of the beam and rearwardly entirely through the beam in the direction along the rotational axis of the cutterhead.*

*15. The main frame according to claim 14, wherein the annual beam is constructed in the form of a hollow box beam.*

*16. The main frame according to claim 14 or 15, wherein the hub structure is formed in a box-like shape having peripheral wall portions defining a central opening.*

*17. The main frame according to claim 14 or 15, wherein the side portions of each of the radial spoke beams includes a pair of spaced apart side plate members.*

*18. A main frame for a rotary cutterhead of an earth boring machine, said main frame comprising:*

*an annular beam by which the cutterhead is mounted onto the earth boring machine for rotation about an axis of rotation;*

*a central hub structure disposed forwardly of the annular beam;*

*a plurality of radial spoke beams having inner ends integrally connected to the hub structure, intermediate portions extending rearwardly and radially outwardly from the hub structure to the annular beam and outer ends which are integrally connected to the annular beam thereby to form the main frame in a generally dome shape, each of the radial spoke beams having side portions defining an elongate opening extending through and substantially along the entire length of the beam; and*

*roller cutter mounts having members which extend transversely across the spoke beam elongate openings to intersect transverse portions of the beams to brace the beams.*

*19. A rotary cutterhead for an earth boring machine, comprising:*

*a main frame having*

*an annular beam by which the cutterhead is mounted on an earth boring machine for rotation about an axis of rotation;*

*a central hub structure disposed forwardly of the annular beam and including a central opening; and*

*a plurality of radial spoke beams having inner ends which are integrally connected to the hub structure and outer ends which are integrally connected to the annular beam, each of the radial spoke beams including side portions defining an elongate opening extending through and along substantially the entire length of the radial spoke beam;*

*roller cutter mounts within the radial spoke beams, the cutter mounts having members which extend transversely of the radial spoke beams to span across the radial spoke beam openings to form cutter compartments and to reinforce the radial spoke beams;*

*wherein the cutter mounts are adapted for installation and removal of roller cutters from the rear side of the cutterhead; and*

*wherein the main frame is configured to provide an interior space for a workman which is large enough to provide room for installation and removal of the roller cutters from behind the cutterhead.*

*20. The rotary cutterhead according to claim 19, wherein the annular beam is formed generally in the shape of a hollow torus.*

*21. The rotary cutterhead according to claim 19, wherein the side portions of each of the radial spoke beams includes a pair of spaced apart side plate members, the side plate members curving rearwardly as they extend radially outwardly from the hub structure to the annular beam.*

*22. A rotary cutterhead according to claim 19, wherein*

*the roller cutter mounts mount roller gauge cutters at the periphery of the cutterhead;*

*the radial spoke beams in the regions of the gauge cutters curve rearwardly generally over the interior space of the main frame as they extend radially outwardly from the hub structure to the annular beam to form the cutterhead in a generally dome shape; and*

*the roller cutter mounts which mount the gauge cutters define generally vertical installation and removal paths at locations forwardly of the annular beam.*

*23. The rotary cutterhead according to claim 19, further comprising a center cutter assembly having a plurality of roller cutters, and means for mounting the roller cutters within the center opening of the hub structure, with peripheral portions of the roller cutters projecting forwardly of the cutterhead main frame.*

* * * * *